(12) United States Patent
Loccisano (10) Patent No.: US 12,203,441 B1
(45) Date of Patent: Jan. 21, 2025

(54) FLUID TURBINE CONFIGURED FOR MOMENT-ARM AND THRUST-FORCE LOAD CONTROL

(71) Applicant: Vincent Loccisano, Wellesley, MA (US)

(72) Inventor: Vincent Loccisano, Wellesley, MA (US)

( * ) Notice: Subject to any disclaimer, the term of this patent is extended or adjusted under 35 U.S.C. 154(b) by 0 days.

(21) Appl. No.: 18/608,697

(22) Filed: Mar. 18, 2024

Related U.S. Application Data (60) Provisional application No. 63/491,060, filed on Mar. 18, 2023.

(51) Int. Cl.
*F03D 7/02* (2006.01)
*F03D 1/04* (2006.01)

(52) U.S. Cl.
CPC .............. *F03D 1/053* (2023.08); *F03D 1/051* (2023.08); *F03D 7/02* (2013.01); *F03D 1/042* (2023.08)

(58) Field of Classification Search
CPC .......... F03D 1/042; F03D 1/051; F03D 1/053; F03D 7/02
See application file for complete search history.

(56) References Cited

U.S. PATENT DOCUMENTS

2014/0030059 A1* 1/2014 Presz, Jr. .............. F03D 1/0675
415/122.1

FOREIGN PATENT DOCUMENTS

| CN | 110863942 A | * | 3/2020 | |
| DE | 20115248 U1 | * | 11/2001 | ............... F03D 1/04 |
| GB | 2467023 A | * | 7/2010 | ............... F03D 1/02 |

* cited by examiner

*Primary Examiner* — Audrey B. Walter (57) ABSTRACT

The present disclosure relates to a shrouded fluid turbine comprising: a turbine shroud surrounding a rotor and an ejector shroud in fluid communication with the trailing edge of the turbine shroud. Further disclosed is a method and apparatus having a unique configuration that provides a means of mitigating loads on structural components. An example embodiment includes the use of the electrical generation equipment as a counterweight. Other embodiments may include axial motion of components to reduce the moment arm of heavy components and to reduce fluid-stream thrust-force on the support structure and a means of controlling the mean-turbine power production in an array of turbines by controlling downstream wake vortices and power output of an upstream turbine while increasing the free-stream flow to, and power output of, a downstream turbine.

3 Claims, 9 Drawing Sheets

FLUID TURBINE CONFIGURED FOR MOMENT-ARM AND THRUST-FORCE LOAD CONTROL

TECHNICAL FIELD

The present disclosure relates to shrouded fluid turbines of a particular structure, and to load mitigation on structural components of such shrouded turbines.

BACKGROUND

During high fluid-stream conditions, components of shrouded turbines may experience loads that exceed the anticipated design or operating criteria.

Horizontal-axis wind turbines typically comprise two-to five-bladed rotors joined at a central hub. Rotor blades are typically pitched to reduce rotor speed in high-wind situations. Example horizontal axis turbines incorporate upstream-mounted nacelles.

The Supervisory Control and Data Acquisition (SCADA) of a turbine park includes the monitoring and optimization of turbines and of the total park electrical output. Horizontal-axis wind turbines provide means of reducing rotor velocity by furling blades or by yawing the turbine out of the free-stream flow.

Fluid turbines may be used to extract energy from a variety of fluids, including air and water. The aerodynamic principles of a mixer-ejector wind turbine generally apply also to hydrodynamic principles of a mixer-ejector water turbine.

BRIEF DESCRIPTION

The present disclosure relates to a fluid turbine system, method and apparatus having a unique configuration that provides a means of controlling and/or mitigating loads on a variety of system components. A counter-balance configuration, in combination with lateral motion of one or more of these components, may provide a means of counter-balancing component weights during operating conditions, and of moving weight toward the center of gravity of the system during high fluid-stream conditions. Actuation of aerodynamic components in an axial direction provides a means of controlling the rotor-thrust force on structural components as well as a means of controlling the mean turbine-power production in an array of turbines.

An example embodiment involves the use of the electrical-generation equipment as a counterweight. Other embodiments include 1.) Axial motion of components to reduce the moment arm of heavy components and to reduce fluid-stream thrust-force on the support structure; 2.) A means of controlling the mean turbine-power production in an array of turbines by controlling downstream wake vortices as well as power-output of an upstream turbine, while increasing the free-stream flow to, and power output of, a downstream turbine.

In an example embodiment, a fluid turbine has a ringed airfoil or turbine shroud that surrounds a rotor. This embodiment may have an ejector shroud that surrounds the trailing edge or exit of the turbine shroud. In one embodiment, the turbine shroud has a trailing edge/exit that is in fluid communication with the leading edge, or inlet, of the ejector shroud. Together, the turbine shroud and the ejector shroud provide a means of energizing the wake behind the rotor plane. The paired shrouds further provide increased mass flow near the inlet of the turbine shroud, at the cross-sectional area of the rotor plane. This is referred to as the optimal rotor plane.

The power coefficient of the mixer-ejector wind turbine may be between approximately 0.6 and 2.0. The power output is derived from the rated fluid velocity and rotor area and results in a given average total pressure-drop across the optimal rotor plane. The total pressure is represented by:

$$\Delta P_T = \frac{\frac{1}{2} * \rho * V_w^3 * CP}{V_a}$$

Where $\Delta P_T$ is the change in total pressure between the upstream and downstream sides of the optimal rotor plane; $\rho$ is the density of the fluid in the stream; Vw is the free-stream fluid speed; Va is the accelerated velocity through the rotor; and CP is the coefficient of power.

In one embodiment, a shrouded turbine uses paired shrouds with cambered, ringed airfoils to improve turbine efficiency. The optimum blade design for the shrouded turbine system may be a function of two key factors: the acceleration of flow at the rotor station induced by the ringed airfoils that make up the shrouds, and the energy addition to the rotor wake flow in the shroud wake. These two results reflect the physics of the shrouded fluid turbine system. In one embodiment, the cambered shroud and ejector enable increased mass flow through the rotor, enabling more energy extraction due to higher flow rates. The shroud combination transfers energy from the bypass flow to the rotor wake flow, enabling higher energy per unit mass flow rate through the rotor. Each effect may compound the other, resulting in increased efficiency and gains in power extraction.

Axial motion of a rotor, upstream or downstream of the optimal rotor plane, may provide reduced free-stream fluid velocity through the rotor, and thereby reduced thrust force on the support structure. Axial motion of an ejector shroud may also provide reduced free-stream fluid velocity through the rotor by controlling efficacy of the mixer-ejector pump, and also by controlling thrust-force on the support structure.

Another embodiment enables reduced moment-arm forces and side-loading on the structural components during excessive fluid-stream flow. "Axial flow" refers to a fluid stream flowing parallel to a rotor's central axis. "Off-axis flow" refers to a fluid stream flowing substantially perpendicular to the rotor's central axis. Axial motion of the nacelle and ejector toward the system's center of gravity reduces moment-arm loads in the support structure. In this manner, the surface area of the present invention, when viewed in an off-axis direction from the centerline of the turbine, is reduced. A reduction in off-axis surface area reduces the resistance of the components against off-axis fluid-stream flow.

Lateral motion of the ejector along the central axis may reduce the downstream wake vortices while controlling the rotor speed and hence the generator power output. A turbine park may therefore be optimized by controlling the turbines in such a manner as to more efficiently control the wake vortices of the upstream turbines; the free-stream fluid flow over downstream located turbines is maximized to ultimately allow for increased energy extraction and production for the entire turbine park.

As understood by one skilled in the art, the aerodynamic principles of a shrouded turbine are not restricted to a specific fluid, and may apply to liquid, gas or combination thereof. The aerodynamic principles of a shrouded wind turbine apply to hydrodynamic principles in a shrouded water turbine.

DETAILED DESCRIPTION

A shrouded turbine provides an improved means of extracting power from flowing fluid. A primary shroud, also referred to as a turbine shroud, surrounds a rotor which extracts power from a primary fluid stream. An ejector shroud in combination with a turbine shroud ingests flow from the primary fluid stream and secondary flow. This shroud combination may promote turbulent mixing of the aforementioned two fluid streams. This mixing enhances the power extraction from the shrouded turbine system by increasing the amount of fluid flow through the system, increasing the velocity at the optimal rotor plane for more power extraction, and reducing the pressure on the downwind side of the optimal rotor plane. The term "rotor" is used herein to refer to any assembly in which one or more blades or blade segments are attached to a shaft and able to rotate, allowing for the generation or extraction of power or energy from fluid flow rotating the blade(s) or blade segments. Example rotors include a conventional propeller-like rotor, a rotor/stator assembly, a multi-segment propeller-like rotor, or any type of rotor understood by one skilled in the art. Similarly the term "blade" is not intended to be limiting in scope and includes all aspects of suitable blades, including those having multiple associated blade segments.

In one embodiment, a nacelle may comprise electrical-generation equipment as is common in the art.

The leading edge of a turbine shroud is considered the front, and the trailing edge of an ejector shroud is considered the rear of the fluid turbine. A first component of the fluid turbine, located closer to the front of the turbine, may be considered "upstream" of a second "downstream" component, which is closer to the rear of the turbine.

In one embodiment, a fluid turbine has a turbine shroud that surrounds a rotor/generator combination with the generator portion housed in a nacelle, and an ejector shroud that surrounds the exit of the turbine shroud. The fluid turbine is configured with the nacelle upstream of the rotor and upstream of both the turbine shroud and the ejector shroud.

In another embodiment, a splined shaft provides rotational movement as well as lateral movement of the rotor and/or the rotor/nacelle combination. One skilled in the art understands that the use of a splined shaft arrangement is one of various ways to provide rotational and linear movement of the rotor and/or the rotor nacelle combination.

Figure 1:
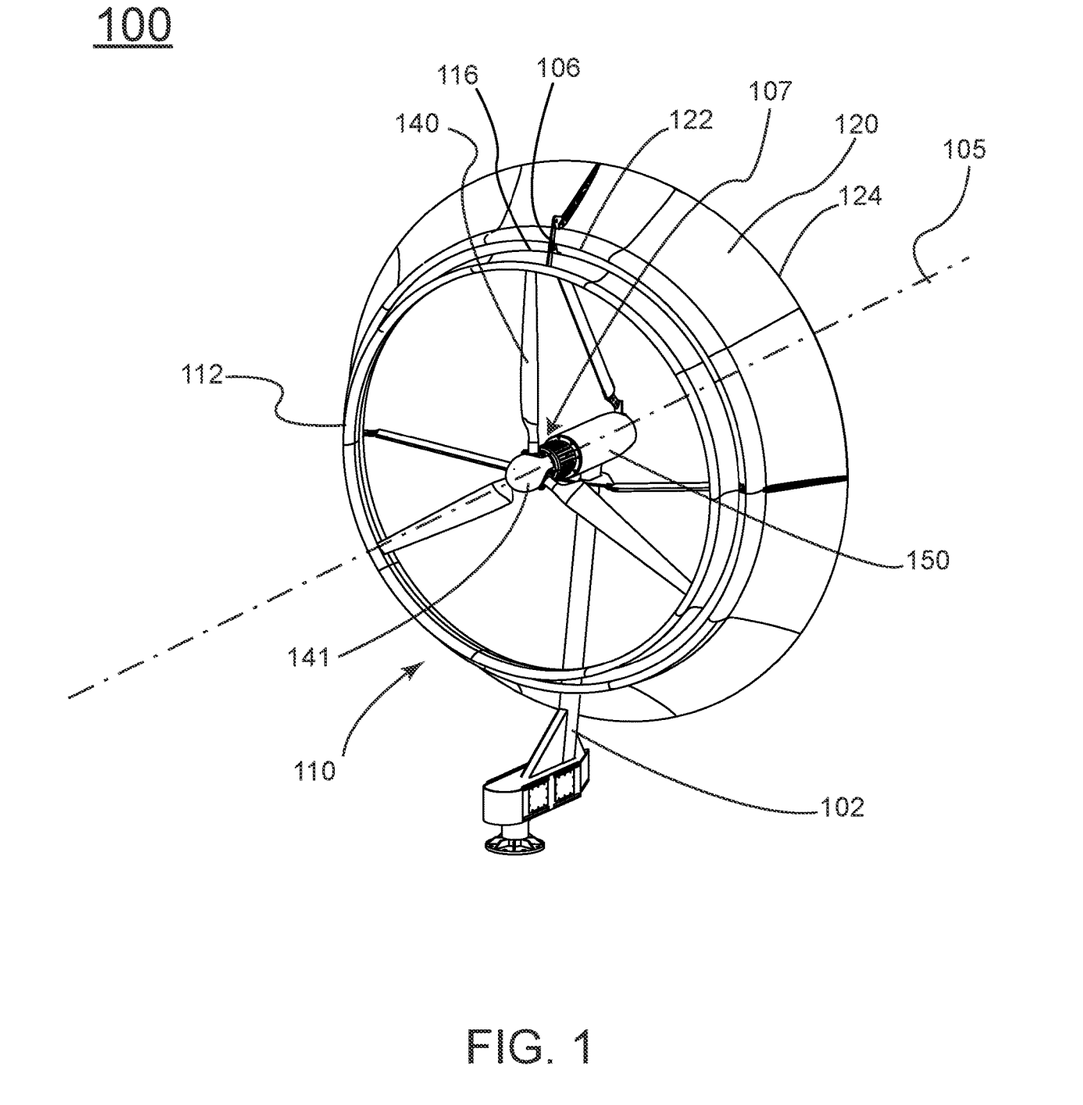
FIG. 1 is a front right, perspective view of an example embodiment.

In FIG. 1, the shrouded fluid turbine 100 comprises a turbine shroud 110, a nacelle body 150, an impeller 140, and an ejector shroud 120. The turbine shroud 110 includes a front end 112, also known as inlet end or leading edge. The turbine shroud 110 has a rear end 116, also known as an exhaust end or trailing edge. The ejector shroud 120 includes a front end, inlet end or leading edge 122 and a rear, exhaust end (trailing edge) 124. Supporting actuators 106 are shown connecting the turbine shroud 110 to the ejector shroud 120.

The nacelle body 150 comprises electrical-generation equipment (not shown) and is engaged with a rotor comprising a central hub 141 at the proximal end of the rotor blades. The turbine shroud 110 is supported by a tower 102. In the present embodiment, the rotor 140, turbine shroud 110, and ejector shroud 120 share a common central axis 105.

Figure 2:
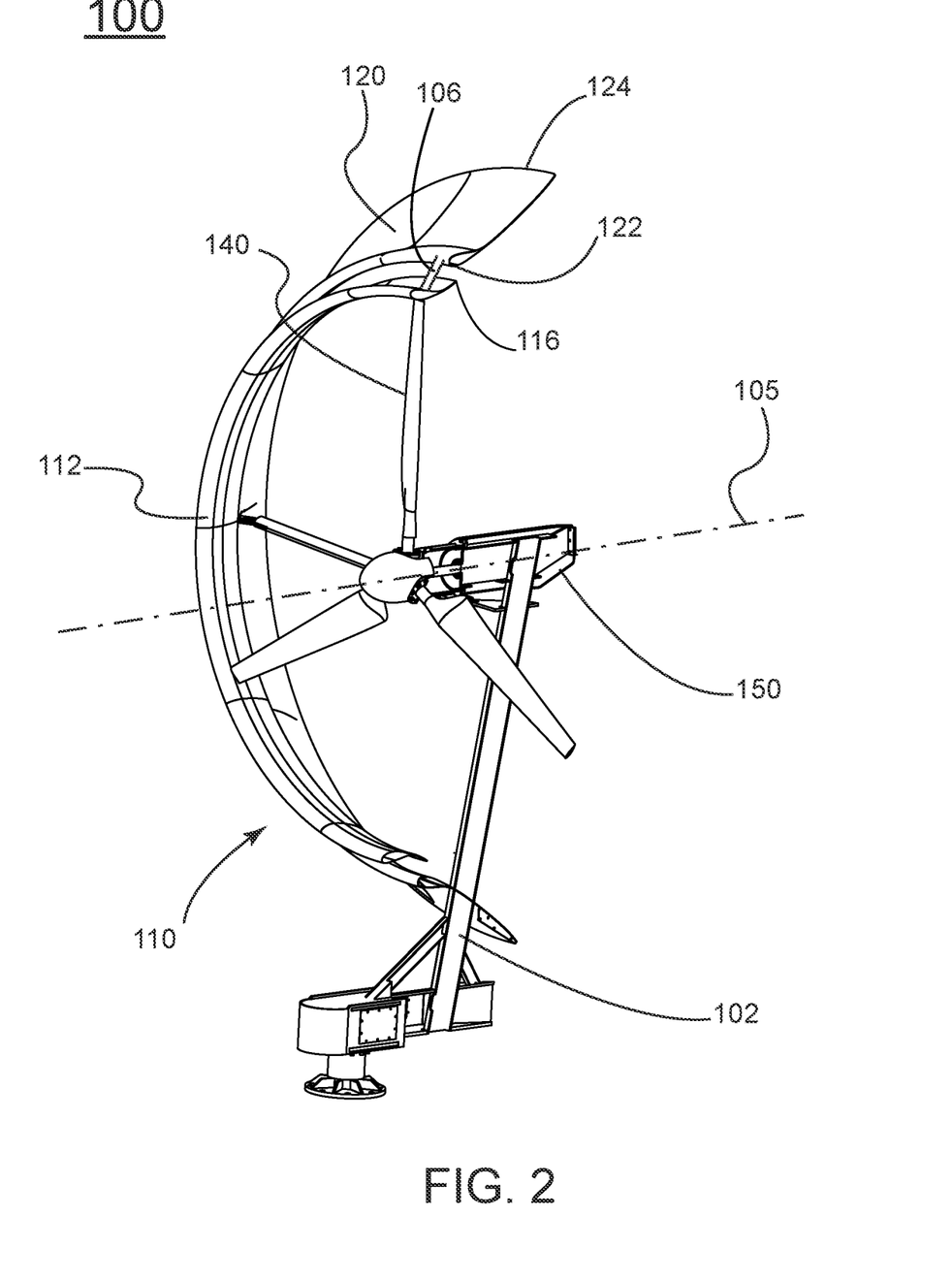
FIG. 2 is a front perspective, cross-section view of the fluid turbine of FIG. 1.
Figure 3:
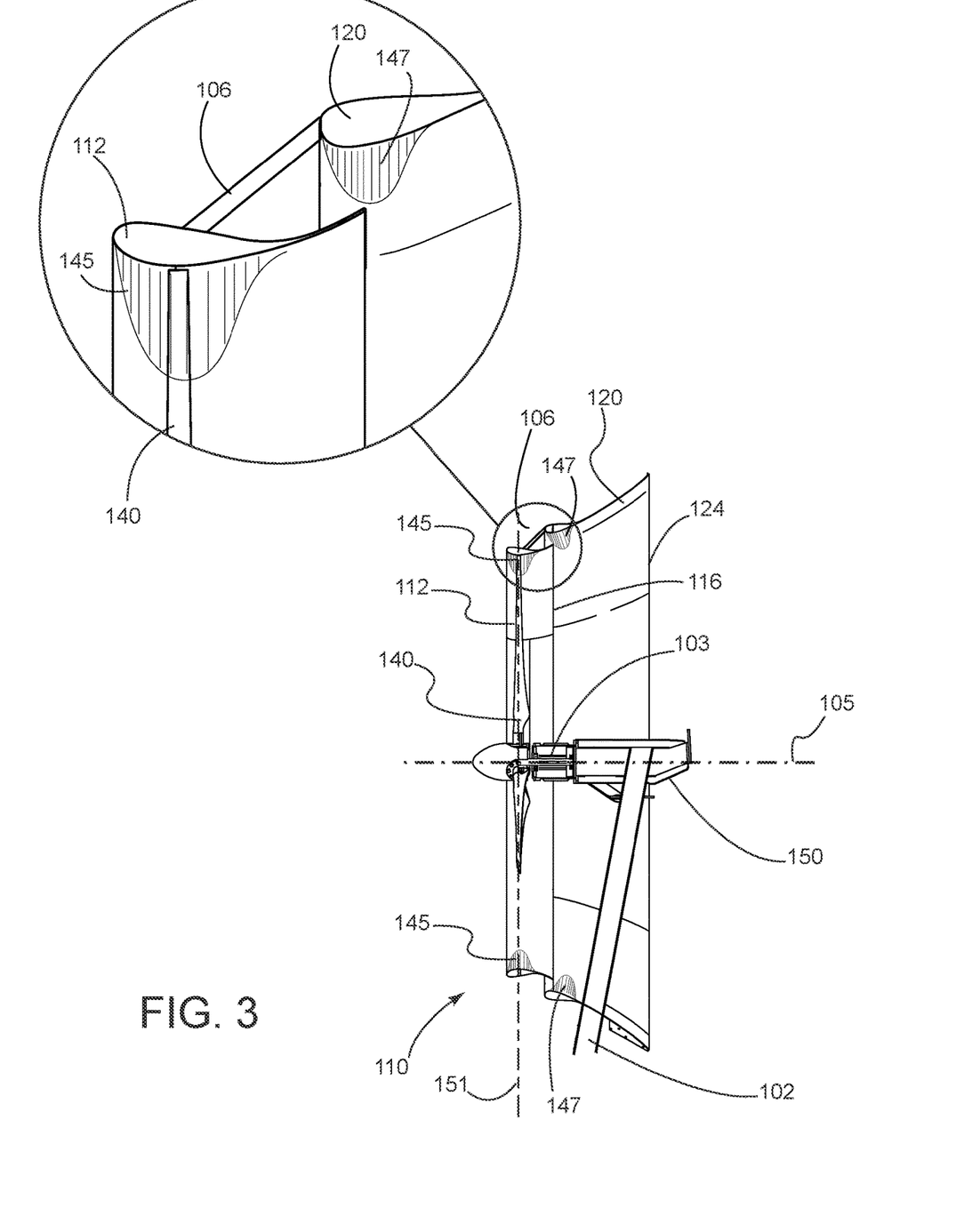
FIG. 3 is a detail, side, cross-section view depicting the upstream mounted nacelle and the optimal rotor plane of the turbine of FIG. 1.

In FIG. 2 and FIG. 3, the turbine shroud has the cross-sectional shape of an airfoil with the suction side (low-pressure side) on the interior of the shroud. An area of relatively low pressure, resulting in increased mass flow through the turbine shroud 110, is denoted by shaded area 145. An area of relatively low pressure, resulting in increased mass flow through the turbine shroud 120, is denoted by shaded area 147. A shrouded turbine is formed by the ejector shroud 120 in fluid communication with the exit of turbine shroud 110. The trailing edge 122 of the turbine shroud 110 extends downstream toward the inlet end 122 of the ejector shroud 120. This shrouded turbine combination enables increased operational efficiency by increasing mass flow through the optimal rotor plane 151 as demonstrated by the low-pressure area 145, and by introducing additional flow in the wake of the rotor as demonstrated by the low-pressure area 147.

The turbine's components are configured to reduce loads on the support structure by use of heavy electrical-generation equipment as a counter-balance to shrouds mounted on the opposite side of the support structure. Moving components in an axial direction, toward or away from the center of gravity, enables control of moment-arm loads on the support structure. Other axial actuation is employed in combination with Supervisory Control and Data Acquisition (SCADA) to control the mean power-output of turbines in an array such as that in a wind-turbine park.

Figure 4:
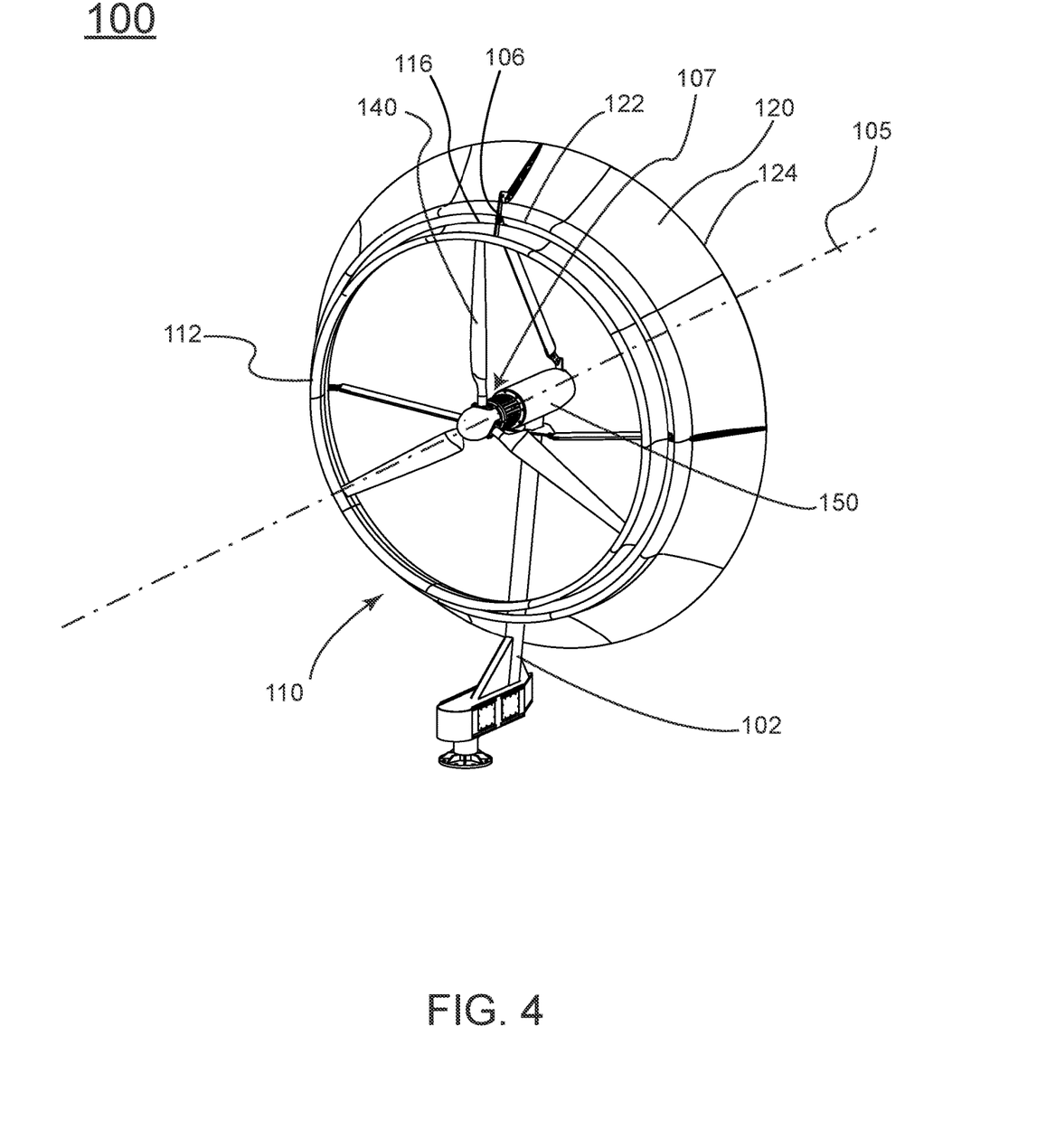
FIG. 4 is a front, perspective view of an example iteration of the turbine of FIG. 1.
Figure 5:
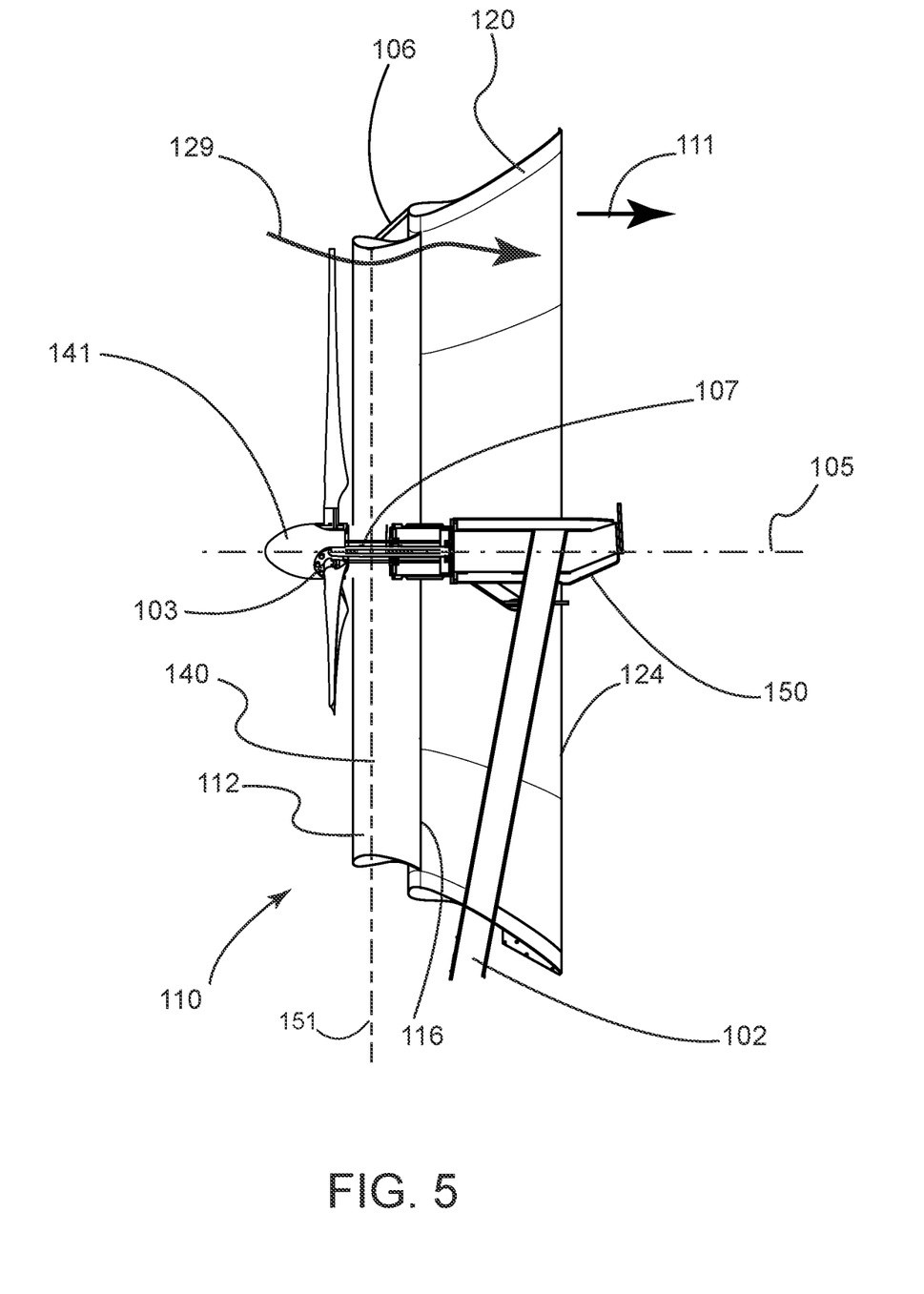
FIG. 5 is a plan, side, cross-section view of the turbine of FIG. 4 depicting a laterally moved nacelle in the upstream position.
Figure 6:
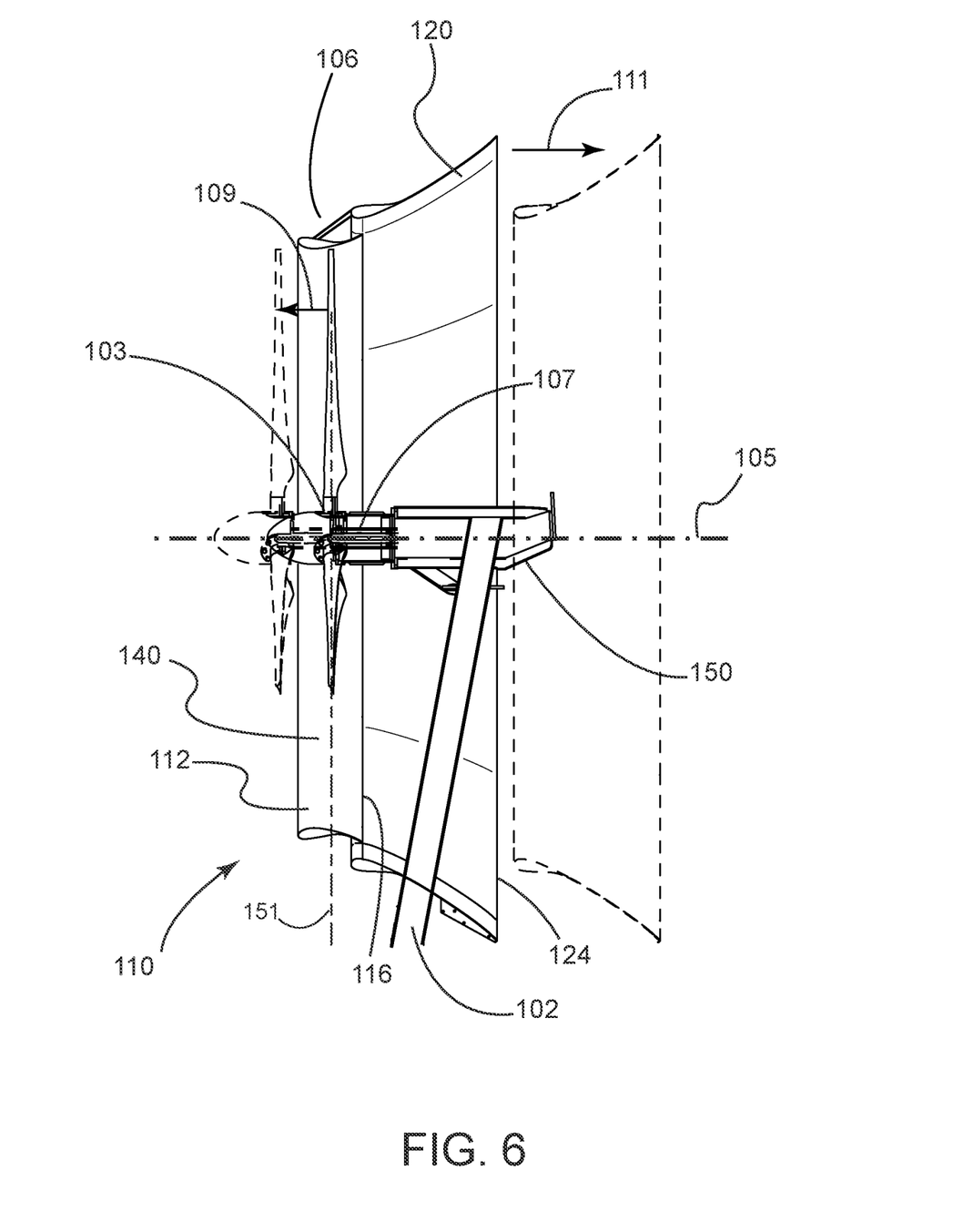
FIG. 6 is a plan, side, cross-section view of the turbine of FIG. 4 depicting a laterally moved nacelle in the downstream position.

FIG. 4, FIG. 5 and FIG. 6 shows the shrouded turbine configured with the nacelle and rotor upwind of the turbine shroud 110 and with the ejector 120 downwind of the turbine shroud 110. A splined shaft 107, or suitable alternative means as understood in the art, is engaged with the rotor 140 and further engaged with electrical-generation equipment that is housed in the nacelle 150. The splined shaft 107 is engaged with the generator and may be actuated so as to move the rotor 140 forward of the optimal rotor plane 151 along the central axis 105 as shown by arrow 109. Actuation/support members 106 provide the mechanical actuation of the ejector shroud 120. The ejector shroud 120 may also be moved downwind of the turbine shroud 110 along the central axis 105 as shown by arrow 111.

In one embodiment the support members 106 are configured to respond to the drag on the ejector shroud 120 caused by the free-stream fluid flow, to move the ejector 120 along the central axis 105, thus controlling the velocity of the fluid flow at the optimal rotor plane 151, further controlling thrust-force on the rotor 140 and hence the support structure 102 while controlling generator rotational speed.

FIG. 5 shows the rotor 140 which may be moved forward of the turbine shroud 110 for the purpose of increasing the space between the rotor-blade tips and the inside surface of the shroud. This may be used to clear debris by allowing it to flow out of the system along arrow 129.

Figure 7:
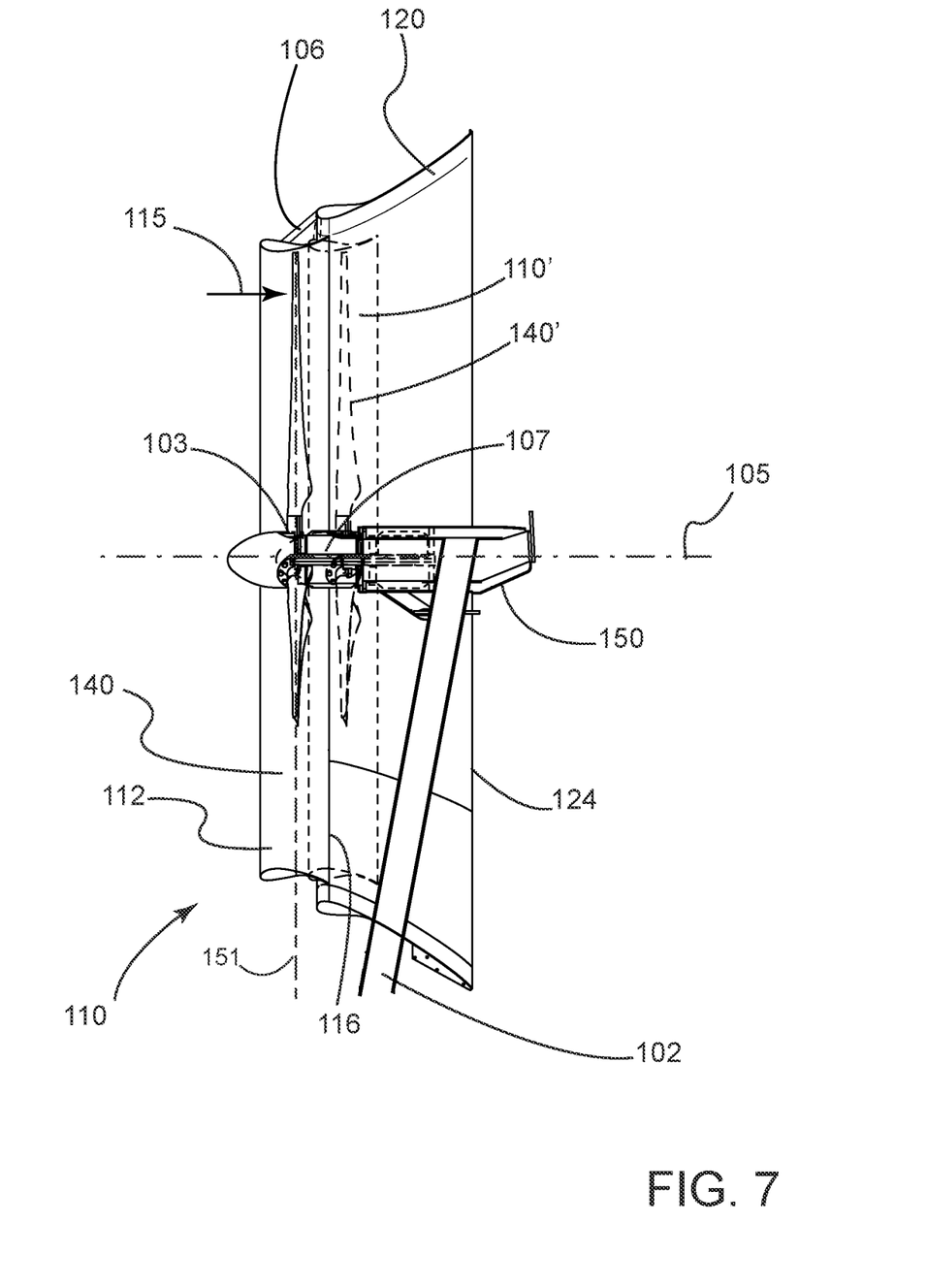
FIG. 7 is a plan, side, cross-section view of the turbine of FIG. 3 depicting a laterally moved ejector in the downstream position.

In FIG. 7, excessive fluid-stream flow causing excessive loading on the support structure 102 often necessitates shutting down the turbine. Moment-arm forces can be controlled by moving the system's center of gravity toward the support structure (arrow 115). Broken lines show the locations of the moved turbine shroud 110' and rotor 140'. The configuration shown in FIG. 6 shows components moved toward the support structure 102. Moment-arm forces on the support structure 102 are reduced, while the surface area of the side profile is also reduced, as seen in FIG. 6. Reduced surface area of the side profile results in reduced fluid-stream forces on the components and reduced forces on the support structure 102.

Figure 8:
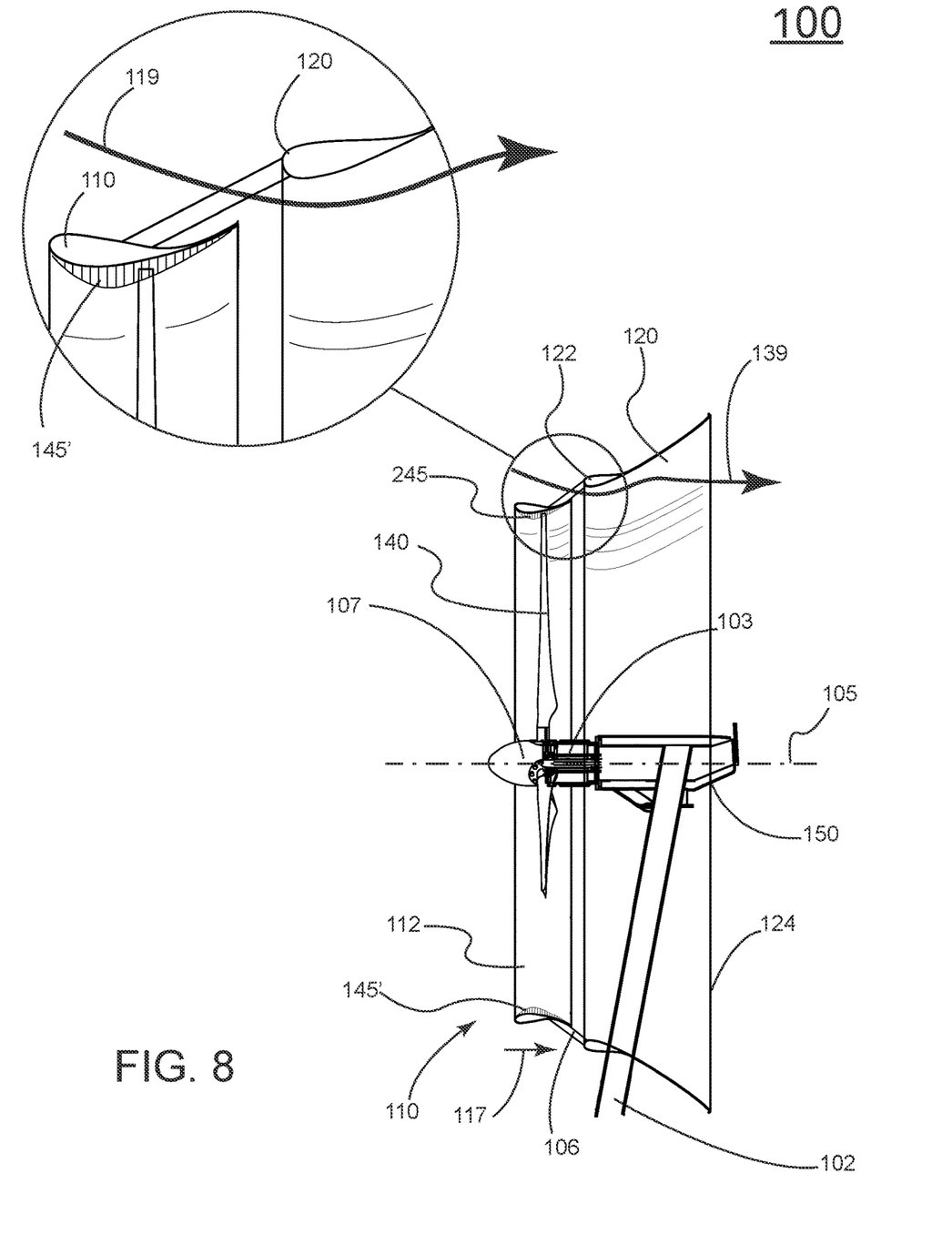
FIG. 8 is a plan, side, cross-section view of the turbine of FIG. 3.
Figure 9:
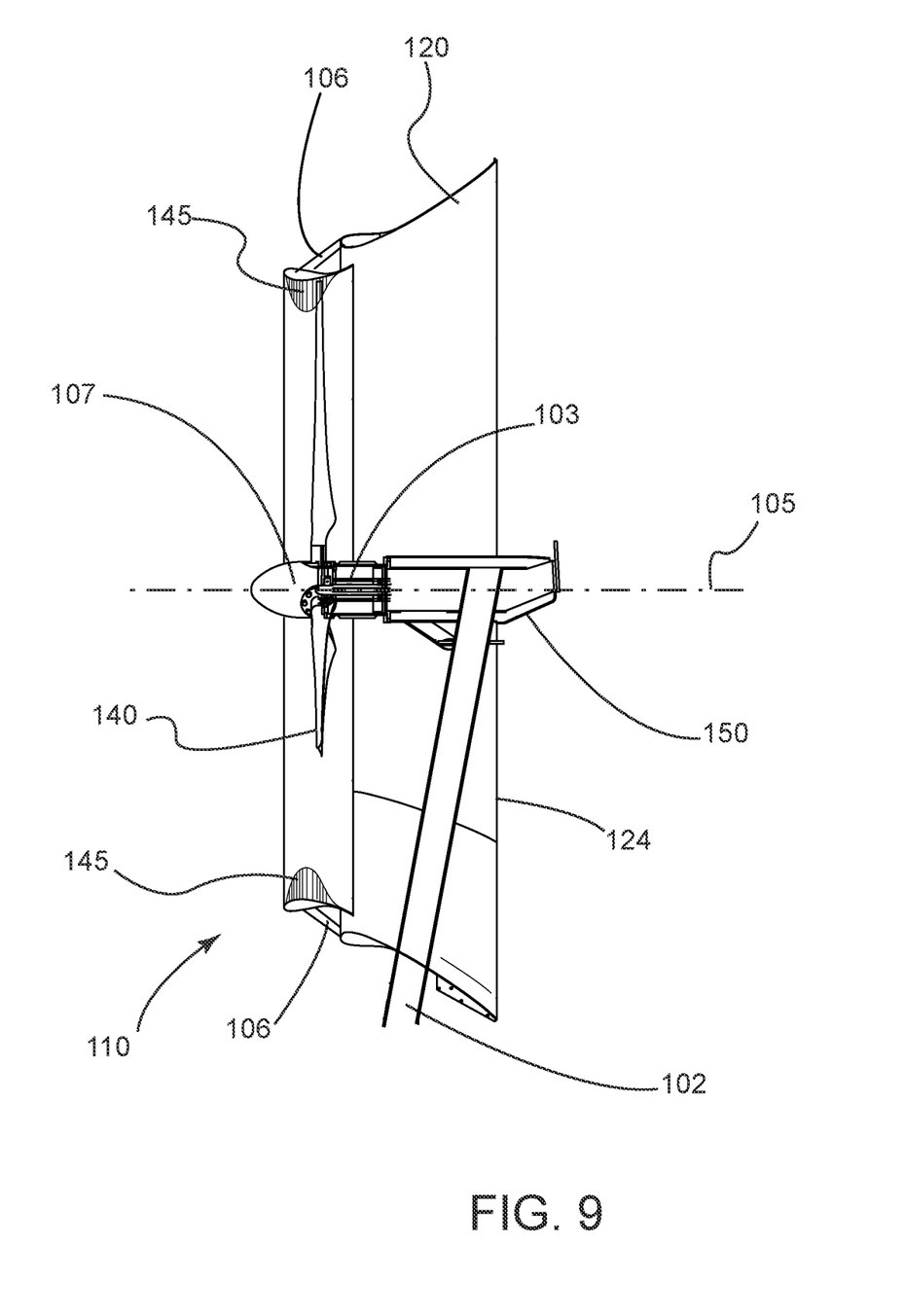
FIG. 9 is a cross section view of the turbine of FIG. 3.

Supervisory Control and Data Acquisition (SCADA) of a turbine park regulates the monitoring and optimization of the turbines and of the total park electrical output. In one configuration, an example embodiment provides a means of controlling the electrical-generation output of an upstream turbine while maximizing a downstream turbine's power-generation efficiency. FIG. 8 and FIG. 9 show two shrouded turbines in plan, cross-section view. The first turbine (FIG. 8) may be said to be upstream of the second turbine (FIG. 9), with the second turbine (FIG. 9) downstream of the first turbine (FIG. 8). FIG. 8 shows an embodiment of a shrouded turbine configured with the ejector 120 moved along the central axis 105 in a downwind direction (arrow 117) with respect to the turbine shroud 110. This configuration reduces the efficacy of the mixer-ejector pump as illustrated by the reduced optimal rotor plane area 145', and provides increased free-stream fluid flow downstream of the turbine, as illustrated by arrow 139. The increased free-stream fluid flow (arrow 139) passes through the ejector 120 toward the next turbine downstream (FIG. 9). The downstream turbine (FIG. 9) provides increased velocity fluid flow at the optimal rotor plane as illustrated by the increased velocity area 145. In a turbine park in which the SCADA system detects turbines producing greater electrical-generation output than turbines downstream, this configuration can reduce the range of individual turbine generation output and can reduce the deviation from the mean-turbine electrical-generation output for each turbine in the array; further, it can maximize the total energy production of the entire park.

The invention claimed is:

1. A fluid turbine comprising:
a rotor mechanically coupled with a generator;
at least a first duct in fluid communication with said rotor;
at least a second duct surrounding a trailing edge of said first duct;
said rotor, said at least a first duct, and said at least a second duct sharing a common central axis;
said rotor movable along said common central axis with respect to said at least a first duct;
said at least a second duct movable along said common central axis; and
an optimal rotor plane that is perpendicular to said common central axis where lift forces on said at least a first duct are greatest; wherein
energy extraction is greatest when said rotor resides at said optimal rotor plane and movement of said rotor along said common central axis, away from said optimal rotor plane, and movement of said at least a second duct along said common central axis away from said rotor and away from said first duct increases free stream flow through said at least a second ringed airfoil and reduces said energy extraction.

2. The fluid turbine of claim 1; wherein
said at least a first duct is a first ringed airfoil having a suction side and a pressure side; and
said suction side is on the interior of said at least a first duct.

3. The fluid turbine of claim 1 further comprising:
a linear motion actuator engaged with said rotor; and
a linear motion actuator engaged with said first duct; wherein
linear actuation of said rotor and said first duct toward said at least a second duct reduces a side profile of said fluid turbine and reduces loads on said fluid turbine during excessive fluid velocity conditions.

\* \* \* \* \*